(12) United States Patent
Slorance (10) Patent No.: US 10,695,241 B2
(45) Date of Patent: Jun. 30, 2020

(54) WHEELCHAIR-TOWABLE ARTICLE

(71) Applicant: Andrew Mackay Slorance, Nairn (GB)

(72) Inventor: Andrew Mackay Slorance, Nairn (GB)

( * ) Notice: Subject to any disclaimer, the term of this patent is extended or adjusted under 35 U.S.C. 154(b) by 0 days.

(21) Appl. No.: 15/627,177

(22) Filed: Jun. 19, 2017

(65) Prior Publication Data

US 2017/0360632 A1    Dec. 21, 2017

(30) Foreign Application Priority Data

Jun. 17, 2016 (GB) .................................. 1610659.3
Jun. 23, 2016 (GB) .................................. 1610966.2

(51) Int. Cl.
*A61G 5/10* (2006.01)
*A45C 5/14* (2006.01)
*B62B 1/16* (2006.01)

(52) U.S. Cl.
CPC ................. *A61G 5/10* (2013.01); *A45C 5/14* (2013.01); *B62B 1/16* (2013.01); *B62B 2301/02* (2013.01); *B62B 2301/254* (2013.01)

(58) Field of Classification Search
CPC .... A61G 5/10; A45C 5/14; B62B 1/16; B62B 2301/02
See application file for complete search history.

(56) References Cited

U.S. PATENT DOCUMENTS

| | | | | |
|---|---|---|---|---|
| 5,769,440 A | * | 6/1998 | Jones | A61G 5/10 280/204 |
| 5,794,957 A | * | 8/1998 | Mendon | A61G 5/10 280/204 |
| 6,186,528 B1 | * | 2/2001 | Walker, Sr. | A61G 5/10 280/204 |
| 6,273,444 B1 | * | 8/2001 | Power | A61G 5/10 280/204 |
| 7,717,450 B2 | * | 5/2010 | Amiri | A61G 5/1054 224/401 |
| 9,150,064 B1 | * | 10/2015 | Landreth | B60D 1/18 |
| 9,980,874 B2 | * | 5/2018 | Donahue | A61H 3/04 |
| 2003/0218312 A1 | * | 11/2003 | Forshee | A61G 5/10 280/304.1 |

FOREIGN PATENT DOCUMENTS

| | | |
|---|---|---|
| CN | 202409309 | 9/2012 |
| JP | 2000140031 | 11/2005 |
| WO | 2016059284 | 4/2016 |

* cited by examiner

*Primary Examiner* — Kevin Hurley
*Assistant Examiner* — Michael R Stabley
(74) *Attorney, Agent, or Firm* — Law Office of Jeff Williams PLLC; J. Oliver Williams (57) ABSTRACT

A wheelchair-towable article, such as a luggage article, having a body portion configured for attaching to a wheelchair by a mounting means to dispose the article to the rear of a seat of the wheelchair so as not to be pivotable about a vertical axis with respect to the wheelchair and having a multi-directional roller arrangement for contact with the ground enables a wheelchair user to transport their own luggage, even heavy loads, without assistance and without unbalancing the wheelchair and whilst maintaining full maneuverability of the wheelchair including tight turns and reversing in tight turns.

4 Claims, 5 Drawing Sheets

WHEELCHAIR-TOWABLE ARTICLE

BACKGROUND

1. Field of the Invention

This invention pertains generally to the field of wheelchairs and luggage for wheelchair users. More particularly, the invention relates to an article configured for towing behind a wheelchair and to a system for towing an article behind a wheelchair.

2. Description of Related Art

Wheelchair users often need to transport luggage or other articles. Conventional luggage is not typically configured for wheelchair use. Rolling suitcases are generally awkward to pull as a wheelchair user and weighty rucksacks or other bags stowed on a wheelchair can make maneuverability difficult and can affect the balance of the wheelchair, particularly a lightweight maneuverable wheelchair which may have a tendency to tip when imbalanced.

There is a need for bespoke luggage or containers adapted for use by wheelchair users. Pannier systems exist which allow a pannier bag to hang on a mount at the rear or sometimes the side of a wheelchair. This is suitable for a small bag although can be cumbersome at the side especially, but for larger loads contributes to imbalance the wheelchair.

Several attempts have been made to facilitate towing of luggage or other articles behind a wheelchair.

A wheelchair-towable suitcase is described in GB-A-2521118 which may be attached to a mounting bar to the rear of the wheelchair and rolls on four wheels mounted on the base of the case. A cut-away sloping area at the base of the case facilitates mounting kerbs. It would not, however, readily facilitate wheelies to address obstacles. A rack mounting for fixing to the back of a wheelchair is described in US-A-2007/222180 which provides a low cross bar extending from the back of the wheelchair onto which the wheels of a conventional wheeled suitcase may be hooked to facilitate towing or onto a pin mounted on said bar a handle of a rolling suitcase may be hooked. Adaptors for mounting onto the back of a wheelchair to which adapted suitcases may be fitted are described in US-A-2012/199716 and GB-A-2497620. US-A-2012/199716 describes a version which is like an arm with an elbow in fixed (but adjustable) orientation for fixing at one end to any bar on, typically, the side of a wheelchair (or pushchair) and an attachment at the other end, for fixing to a wheeled case to be towed, in the form of a ball and socket to allow freedom of movement of the wheeled case in all directions during towing. GB-A-2497620 describes a tow-bar for a towable article for fitting onto a pushchair or wheelchair in which the tow-bar fits, via a clamp, securely onto a horizontal bar such as an axle of the pushchair and provides a ball and socket type tow bar for fitting of a socket-type hitch attachment of a luggage or other article, such that the towed article may freely rotate about a vertical axis when towed.

A drawback of wheelchair towable luggage of the prior art is that whilst it might enable luggage to be towed freely behind the wheelchair, it typically is restrictive in the maneuverability of the wheelchair particularly when taking a tight turn—instead the turning circle is defined by the distance between the wheelchair back wheels and the wheels of the towed article and the angle obtained by the articulated attachment, which is a considerable limitation in the turning maneuverability of a wheelchair. Furthermore, such wheelchair-towable articles having a tow bar, for example, to facilitate towing are particularly restrictive when moving backwards, especially when trying to move backwards whilst turning—the 'trailer' type arrangement of such towable articles have a tendency to jack-knife, causing considerably maneuverability issues for the wheelchair user.

It would be desirable to have a luggage article for a wheelchair, particularly a towable luggage article, to enable wheelchair users to transport loads without unbalancing the wheelchair and without restricting or inhibiting the wheelchair users access or mobility and whilst maintaining and maneuverability of the wheelchair in all directions.

The present inventor has devised a wheelchair-towable article, suitable as luggage, which addresses the aforementioned shortcomings of the prior art.

There is a need for improvements in luggage articles for wheelchairs which enable the transport of considerable loads whilst maintaining the balance and maneuverability of the wheelchair.

It is an object of the invention to provide a wheelchair-towable article which enables maneuverability of the wheelchair to be maintained.

SUMMARY OF THE INVENTION

In accordance with a first aspect of the invention, there is provided a wheelchair-towable article comprising a body portion configured for attaching to a wheelchair via a mounting means to dispose the article to the rear of a seat of the wheelchair and disposed on the body portion a multi-directional roller arrangement for contact with the ground, wherein the body portion is configured not to be pivotable about a vertical axis with respect to the wheelchair.

In a second aspect of the invention, there is provided a towable article comprising a body portion configured for attaching to a towing body via a mounting means to dispose the article to the rear of the towing body and disposed on the body portion a multi-directional roller arrangement for contact with the ground, wherein the body portion is configured not to be pivotable about a vertical axis with respect to the towing body. The towing body in this aspect may be any suitable towing body, such as a suitably harnessed animal or more preferably a vehicle such as one or a combination of a remotely controlled vehicle, a personal individual vehicle (that may be electromotive, such as a battery powered vehicle), a motorized stand-on or sit-on device (such as a Segway™ or a Swegway™) and preferably a two-weeled device, a hoverboard, a motorized mobility scooter, a scooter, a bicycle or a go-cart. Preferably the towing body is provided with a horizontal mounting bar for attachment of the towable article. Optionally, features described hereinafter in relation to a wheelchair-towable article may, where the context allows, be applied to the towable article of this aspect.

In a third aspect of the invention, there is provided a method of manufacturing an article as defined above, the method comprising providing a body portion and disposing on the body portion a multi-directional roller arrangement for contact with the ground and affixing to the body portion a mounting means to dispose the article to the rear of a seat of the wheelchair in such a manner that the body portion is configured not to be pivotable about a vertical axis with respect to the wheelchair.

In a fourth aspect of the invention, there is provided a mounting means for removably mounting an article to a rod or bar, the mounting means comprising: a fixing means for securing the mounting means to an article to be mounted to a rod or bar; and an elongate gripping member having a profile that defines a rod or bar-engaging channel having a mouth defined by first and second resiliently deflectable opposing lips.

In a fifth aspect of the invention, there is provided a kit for adapting an article body to become a wheelchair-towable article as defined above, the kit comprising a mounting means adapted for removably mounting an article to which it is affixed to a rod or bar and having a fixing means for securing the mounting means to the article body and preferably a multi-directional roller arrangement adapted for fitting to the article body so as to be in contact with the ground in use.

The article and system of the present invention enable a wheelchair user to transport their own luggage, even heavy loads, without assistance and without unbalancing the wheelchair and whilst maintaining full maneuvrability of the wheelchair including tight turns and reversing in tight turns.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative The invention is concerned with a wheelchair-towable article which has a body portion and which article is configured for attaching to a wheelchair via a mounting means so as to dispose the article to the rear of a seat of the wheelchair (e.g. behind the seat back) and disposed on the body portion of the article a multi-directional roller arrangement for contact with the ground, wherein the body portion is configured not to be pivotable about a vertical axis with respect to the wheelchair.

By restricting the configuration of the article to not be pivotable or rotatable about a vertical axis relative to the wheelchair, the wheelchair may become considerably more maneuvrable. In particular when trying to turn tightly in a forward motion or when stationary, a towable article which is pivotable about a vertical axis can be caused to jam against a wheel and limit rotation of the wheelchair and when trying to reverse, especially when trying to reverse and turn, a towable article which is pivotable about a vertical axis will tend to jackknife. By configuring a towable article so as the body portion is not pivotable about a vertical axis relative to a wheelchair to which it is attached, such limitations in maneuvrability are addressed. The combination of this restriction in relative rotation of the body portion (about a vertical axis relative to the wheelchair) and the provision of multi-directional wheels as discussed below together provide considerable maneuvrablity for the wheelchair user with a towable article.

Preferably, the article is configured such that the body portion does not pivot about a wheelchair longitudinal axis relative to the wheelchair, a wheelchair longitudinal axis being the axis of general symmetry of the wheelchair.

Preferably, the article according to the invention is configured such that the body portion is pivotable only about a transverse axis relative to the wheelchair (that is with no vertical component, but more transverse than longitudinal component). More preferably, the transverse axis is parallel with a wheel axis of the wheel chair to which it is to be attached.

Various configurations and means for providing limitation in relative movement between a towable article and a wheelchair as may be required by the invention or preferred embodiments may be adopted, examples of which are defined herein.

The article preferably includes the mounting means integral or permanently mounted to the body portion thereof, but optionally may be provided in kit form that may comprise a body portion and a mounting means attachable to the body portion, which kit may optionally further comprise a multi-directional roller arrangement adapted for fitting to a body portion. The description hereafter describes the invention in terms of the article of the first aspect, but it should be understood that the features may define elements of it where the context allows. Further, description of features in relation to the mounting means should be understood, where the context allows, to refer also to features of the aspect of the invention directed to a mounting means.

The mounting means may comprise any suitable arrangement for removably attaching a towable article to a wheelchair to dispose it to the rear of the wheelchair and facilitate towing whilst not allowing pivoting of the body portion about a vertical axis.

The mounting means may comprises one or more members, attachments or fixings for mounting or securing to a corresponding component on the wheelchair, which may together be an attachment system. For example, an attachment system could comprise two ball and socket fittings (commonly used in towing articles) disposed in a lateral arrangement in which one part of each ball and socket fitting is fixedly disposed on a wheelchair (typically the ball part) and the other part is provided as part of the mounting means and rigidly mounted relative to the body portion, each of which fittings may on its own facilitate relative rotation or pivoting in all directions. By mounting both mounting means (e.g. socket fittings) to corresponding fitting parts on the wheelchair (e.g. ball fittings) which are dispose on a common horizontal arrangement or axis preferably, the combined mounting would spread the load, facilitate rotation about a horizontal axis and prevent rotation about a vertical axis. Thus, multi-directional and multi-rotational fittings (and attachments systems) such as ball and socket arrangements or multi-directional hinges may be used provided that there are at least two such arrangements, they are disposed in a common horizontal arrangement or axis and the respective components of each such attachment system is fixedly mounted to the wheelchair or body portion (or at least fixedly mounted relative to the other and together absent a rotational freedom of movement about a vertical axis)

Preferably, the or each mounting means or mounting member does not facilitate (e.g. when mounted with a corresponding component forming an attachment system) any rotation about a vertical axis.

The mounting means may be configured to mount to any attachment feature on a wheelchair. For example, it could be configured to mount to a pair of upright bars laterally disposed each side of the rear of the wheelchair. According to such an arrangement, there may be a two upright bar mounting elements which securely and rigidly affix the mounting means to the upright bars (e.g. clamp members), a fixing member for securing the mounting elements to the body portion of the article and a linking mechanism connecting the clamp members to the fixing member which linking mechanism may facilitate rotation of the body portion about a horizontal axis (e.g. two horizontally disposed hinge joints), but inhibit rotation about a vertical axis (either by having no function of rotating about a vertical axis or by having the linking mechanisms in fixed mounting arrangements with the body portion and clamp member and disposing movable joints in a horizontal arrangement).

Preferably, the mounting means is configured to mount to a horizontal bar or tube provided on a wheelchair. Optional locations for such a horizontal bar are bar on the wheelchair frame that is commonly provided on the rear of wheelchairs (e.g. about 50 to 80 cm from the ground) or the wheel axle horizontal bar provided for the wheels of the wheelchair. Alternatively, a kit could be provided to fit a horizontal bar on the rear of any wheelchair as a further aspect of the invention. Preferably the mounting means is configured to be pivotable about the longitudinal axis of the horizontal bar or tube but fixedly mounted about all other axes.

In the embodiment in which the mounting means is configured to mount to a horizontal bar (or other mounting position), the mounting means may comprise one or more mounting members configured for engagement with the horizontal bar (or other mounting position), which may be resilient gripper members. Preferably, the mounting means comprises a single mounting member configured for engagement with a horizontal bar or tube.

The mounting means according to this embodiment in which it is configured to mount to a horizontal bar (or to another mounting position) typically comprises an attachment, which attaches or is for attaching the mounting means to the article or rather to a body portion of the article (where the article may be considered to include the mounting means), a mounting member for engaging or fixing to a horizontal bar (or other mounting position on a wheelchair) and a linkage linking the attachment and mounting member. The attachment may optionally be a fixing means for securing, preferably permanently but optionally removably, the mounting means to a body portion of the article (or to the article). Where the body portion is elongate, the attachment may be attached to a proximal portion or a medial portion of the body portion. For example, where an elongate body portion is provided, which is longer than the height from the ground of the mounting point but such as it may be disposed at an angle of less than 60° to the vertical, more pertinently less than 45°, it may be useful to provide the attachment to a medial portion of the body portion (e.g. middle third in terms of longitudinal extent) to minimize the risk of jacking of the wheelchair when moving backwards. It is generally preferable, however, to provide the attachment to a proximal portion (e.g. proximal third or proximal quarter and more preferably proximal end) of the body portion. The attachment being preferably a fixing means may comprise a flange having a series of apertures formed therein for receiving therethrough a fixing such as a screw or similar which can fix to the body portion. Preferably two flange members (e.g. orthogonal to one another) may extend from the mounting means to provide two fixing points to the body portion. The linkage may be any suitable arrangement for linking the attachment (for the body portion) to a mounting member for receiving a bar or rod (or for mounting to another mounting position). The linkage may be extended (or even extendable) to increase (or vary) the separation between the attachment and the mounting member (and thus between the body portion and wheelchair), for example to link a bar or rod (or other mounting position) to an attachment attached to a medial portion of the body portion, or may be short or minimal so that the attachment and mounting member are close coupled and thus the body portion may be disposed very close to the wheelchair. The latter alternative is preferred in the case of a luggage article, in particular, since the closer the article is to the wheelchair (and more particularly the closer the roller arrangement of the article is to the wheels of the wheelchair), the less distance the article and its roller arrangement will have to travel leading to less resistance and greater maneuvrability. Furthermore, by close coupling the attachment and the mounting member (and thus the body portion and the mounting member) there is a relatively lower amount of stress placed on the mounting means itself and the joint between the mounting means and a horizontal bar on a wheelchair, as compared with an extended coupling.

The linkage may further comprise a hinge or joint for facilitating rotation or pivoting of the body portion about a transverse horizontal axis that may be offset from the longitudinal axis of the bar. Such an offset hinge or joint may be a fixed or permanent hinge or joint or may be formed of two separable components (e.g. a tow-bar and socket arrangement configured, for example with sheared side faces so that only rotation about a horizontal transverse axis is enabled). Preferably, however, the linkage is rigidly and fixedly formed with respect to each of the mounting member and the fixing means.

In a preferred embodiment, the article and mounting position (e.g. horizontal rod or bar) are close coupled, the linkage being compact and attaching the horizontal bar via the mounting member to a nearest position on the article via an attachment (or fixing means), which is preferably a proximal portion (or proximal end) of an elongate article, for example. Preferably the linkage is short (e.g. less than 15 cm in length). Typically, when assembled and attached between a wheelchair and an article, the attachment and the mounting member are disposed at roughly the same height from the ground (e.g. within 20 cm or more preferably within 10 cm of one another).

Alternatively, an extended linkage can be provided. According to this alternative embodiment, an extended linkage (which may preferably be a rigid elongate linkage member) can enable an attachment to an article to be separated in height from the mounting member, e.g. considerably closer to the ground, whereby for example the attachment may be separated by at least 30 cm from the mounting member and optionally considerably further. This can enable an elongate body portion (especially where it is likely to be mounted at an angle of less than 60° to the vertical) to be attached in its medial portion or to be attached at its proximal portion but disposed at a much greater angle to the vertical. It may also facilitate the towing of four-wheeled articles (such as four-wheeled luggage articles).

An elongate gripping member or plurality of gripping members are preferably arranged to extend over a sufficient (longitudinal—being the elongate direction of the gripping member parallel to the axis of the horizontal bar when engaged) distance to minimize movement about a vertical axis and to spread the load of any force about such an axis. Optionally the mounting means comprises a plurality of gripping members each defining a channel, which are coaxially disposed whereby the channels are aligned to receive a horizontal bar and whereby the load of any rotational forces about a vertical axis can be spread. Such plurality of gripping members may be two up to six, for example, and may each define channels of say 2 to 5 cm in length and cumulatively (including gaps between the gripping members) may extend along a length of up to 30 cm, e.g. from 5 cm to 15 cm. Preferably, the gripping means comprises a single elongate gripping member which preferably defines a channel of at least 2 cm in length, more preferably at least 3 cm, still more preferably at least 5 cm, preferably up to 20 cm, more preferably from about 6 cm to about 18 cm, e.g. from 7 cm to about 10 cm or from about 14 to 18 cm. Most preferably, the channel is from about 8 to 16 cm. Such a size is a good length for ensuring a good grip and good engagement between the horizontal bar and the mounting means and to inhibit unwanted rotational movement of the body portion of the article about a vertical axis.

In a preferred embodiment, the mounting means comprises a mounting member which is preferably in the form of an elongate gripping member defining a channel for receiving or engaging with a horizontal bar or tube preferably via a mouth or opening defined by one or more resiliently deflectable lips or arms of the elongate gripping member. Preferably, the mounting member is rotatable relative to the horizontal bar or tube when in the channel about a longitudinal axis of the bar (and channel, which will when engaged preferably define the same longitudinal axis).

Preferably, the channel has a resting diameter (when it does not have a bar engaged therein) and an engaged diameter (when it does have a bar engaged therein). The engaged diameter is typically identical to the diameter of the bar and the resting diameter is typically less than the engaged diameter by a small margin, whereupon on engaging the bar in the channel, the lips are deflected to receive the bar and return almost to the starting position to provide a snug grip on the bar. The channel may be sized to receive any sized bar, for example from 1 cm diameter to 10 cm or up to 5 cm diameter for example and more typically at least 2 cm. Preferably and as provided in a more particular embodiment described below, the channel may be sized to accommodate a bar having a diameter from 15 mm to 30 mm, more preferably 19 mm to 25 mm (and ideally adaptable to accommodate various diameters of bar). The gripping member may be rotatable about the (common) longitudinal axis of the bar and channel in this configuration.

According to one preferred embodiment, a gripping member defining a bar-receiving channel preferably comprises an elongate heal portion (preferably from which flanges for fixing the mounting means to a body portion may extend and) from which extends a resiliently flexible shaped member which defines the channel. The shaped member is typically curved so as to defined a partial and open cylindrical shape (or more generally partial and open prismic shape) the channel defined within having a maximum resting width or diameter of less than the bar to which it is to be mounted, the incomplete portion of which defines an elongate mouth of a width less than the resting width of the channel. The mouth is preferably defined by two lips—a supporting lip disposed proximal to the heal portion and a deflecting lip disposed at a peripheral edge of the shaped member. In order to receive a bar to which it is to be mounted the lips of the mouth may be placed against the bar and force applied to push the gripping member toward the bar, whereby the deflecting lip will deflect outward, by virtue of the resiliently flexible shaped member, opening the mouth until the bar passes into the channel whereupon the resilient nature of the shaped member will cause the deflecting lip to return as far as the bar will allow. The bar will now be secured and in contiguous contact with the interior surface of the shaped member within the channel defined thereby.

Preferably, a return lever is provided for facilitating removal of the gripping member from the bar, which lever is a second shaped and typically curved elongate member which has extends with a generally larger radius that the channel-defining shaped member and extends in a return configuration from a peripheral portion of the shaped member. The return lever should generally be considerably more rigid (e.g. formed of thicker material) than the shaped channel-forming member such that when it is pressed down at its end or used to pull up the shaped member, it remains integral and causes the shaped member to flex, deflecting outward the deflecting lip and enabling the bar to be removed from the channel. Preferably, a return lever is shaped that a user's palm or the heal of a user's hand may be used to press down on an end of the return lever while the user's fingers may extend along the return lever's length and around a curve that it may define back toward the peripheral portion of the shaped member whereby the user may lift the curved member so as the bar comes out of the channel and the bag may be lifted off (at the same time as opening the channel to enable it to be removed).

In a preferred embodiment, the gripping member comprises the elongate resiliently flexible shaped member such as described above, which defines a bar-receiving channel, and an elongate inner sleeve which may be received in and line the channel prior to receiving a bar. The inner sleeve is preferably shaped at its outer surface to conform with the inner surface of the shaped member (typically a partial and open cylindrical shape) and is provided with corrugations, castellations or protrusions (e.g. defining ribs) which act to facilitate the resilient flexibility of the shaped member and allow the sleeve to follow the form of the shaped member when moved and also to reduce the diameter of the channel to snuggly receive a narrower bar. Preferably the inner sleeve is inter-changeable so that different extents of corrugation or castellations (comprising elongate ridges or ribs and grooves) may be provided to accommodate different diameters of bar. By providing a sleeve with such ridges or ribs and grooves, the diameter of the ridge or rib surface defines the effective channel diameter (the space in which a bar may be received) whilst the distance from the outside surface of the shaped member to the level of the groove of the inner sleeve defines the effective thickness of the gripping member and thus the thickness. By deploying an inner sleeve of selected rib or ridge extent according to the bar diameter as required, a range of bar diameter can be accommodated whilst maintaining the flexibility of the gripping member (and thus the ease with which it may be attached to and removed from a bar) at a relatively constant level. The sleeve may be fitted and secured in the channel by any suitable means, one preferred option of which is providing an elongate retaining element having a generally bulged profile at each elongate peripheral edge of the sleeve which may be received by a corresponding retaining slot disposed in or adjacent to the channel (e.g. on the channel edge of the opposing lips of the mouth). Thus, various sizes of bar may be accommodated in a gripping member of a mounting means affixed to a body portion of a towable article.

According to a second preferred embodiment, a mounting member comprises an elongate gripping member or gripping arrangement defining a bar-receiving channel. The gripping arrangement preferably comprises a pair of opposing lips, defining a mouth for receiving a bar into the channel. The opposing lips are preferably resiliently deflectable and define an elongate mouth that has a maximum resting width in situ of less than the bar-receiving channel (and thus of less than the bar). In order to receive a bar to which it is to be mounted the lips of the mouth may be placed against the bar and force applied to push the gripping member toward the bar, whereby the deflecting lips will deflect outward opening the mouth until the bar passes into the channel whereupon the resilient deflecting lips will to return as far as the bar will allow. The bar will now be secured and in contiguous contact with the interior surface defining the channel.

The mounting member, and gripping arrangement, according to this embodiment preferably comprise a shaped receiving member or members defining an elongate recess (elongate features according to this application are typically laterally disposed relative to the orientation of the article) and an elongate adjustable gripping sleeve, the shaped member and sleeve configured such that the sleeve is receivable into the recess. The adjustable gripping sleeve preferably defines the channel, between two opposed, curved leaves extending from a spine (that is positioned uppermost and extends first into the recess, in this embodiment) which curved leaves at their ends distal from the spine comprise lips that define the mouth to the channel. The leaves and lips are typically resiliently deflectable. The adjustable gripping sleeve may be secured into position in the recess relative to the shaped receiving member. By its position in and relationship with the recess and the shaped receiving member, the adjustable gripping sleeve is restricted as to how much the leaves and lips may deflect and thus the size of horizontal bar it may receive into the channel. The arrangement between the shaped receiving member and adjustable gripping sleeve further serve to provide a more reliable attachment, which does not so readily slip of when using and more particularly protects the gripping member, especially the adjustable gripping sleeve and the leaves thereof, from stress or damage (e.g. while a pressure is applied to an article in a non-linear direction, such as while turning or twisting) at different or specific parts of the length of the sleeve, since it limits the degree of deflection and provides a degree of rigidity that may accommodate stresses on the gripping member.

Preferably, the shaped receiving member extends from the attachment of the mounting means via a fixed and rigid linkage. Preferably an elongate heal member is provided by way of the linkage from which extends a rigid shaped member (generally curved) which, in situ secured to an upper part of an article such as a luggage article, defines a recess in an underside of the shaped receiving member.

Preferably, the shaped receiving member is configured to receive adjustable gripping sleeves of different sizes (in particular, a different diameter of channel and corresponding size of mouth) so as to enable the mounting means to be conveniently adapted for use with different diameter of elongate bar.

Preferably, the elongate recess is tapered and preferably tapers inwards, or typically in situ upwards, from an entrance to the recess. The shaped receiving member preferably defines a profile having an inwardly tapered recess. According to this embodiment, by virtue of the tapered profile of the recess, a range of adjustable gripping sleeves of different diameters may be received into the recess (spine first) and fit snugly at different respective depths within the recess whereupon the leaves of the adjustable griping sleeve abut respective internal sloping surfaces of the receiving member defining the sides of the recess. Preferably the recess has a trapezoid profile.

In a further preferred embodiment, the adjustable gripping sleeve may be adjustably secured within the recess by an adjustable fitting, whereby it may be fixed at varying or a range of depths within the recess. Thus, an adjustable gripping sleeve that is received in the recess to a point where the leaves snugly abut the sides (or internal surfaces of the member defining the recess) can be said to be configured to fit an elongate bar or rod of a first diameter of that may be received within the channel. So that the gripping arrangement can be adjusted to fit a bar or rod of a second narrower diameter or to fine tune the fitting so that the gripping member does not slip off the bar at inappropriate or inconvenient times, the adjustable fitting may be adjusted to reduce the effective diameter of the channel or to increase the effective diameter of the channel. This is done, typically, by causing the adjustable gripping sleeve to be drawn further into the recess or extended further out of the recess. By drawing the adjustable gripping sleeve further into the recess and securing in position, the resiliently deflectable leaves are deflected inwards and restrained in that deflected inwards position, thereby effectively reducing the diameter of the channel and the size and flexibility of the mouth/lips. Thus, providing a more snug fit or enabling a narrower diameter bar or rod to be received.

Preferably, the adjustable gripping sleeve is secured by adjustable bolts or similar fixings extending from the spine of the adjustable gripping sleeve through fixing holes or receiving aperture in (an upper portion) of the shaped receiving member. By tightening the fixings at the upper portion of the receiving member, for example, the adjustable gripping sleeve may be drawn further into the recess thereby tightening the fitting. A user should set the tightness that best suits their needs, typically the size of a horizontal bar on the user's wheelchair, and once set, the user will not need to adjust the setting and be able to push on and pull off the mounting means or mounting member from their wheelchair.

Thus, this embodiment provides an adaptable and/or adjustable elongate gripping member or arrangement and thereby an adaptable and/or adjustable mounting means (or mounting) for mounting an article to a rod or bar whereby a rod or bar may be received in a rod- or bar-engaging channel having a mouth defined by first and second resiliently deflectable opposing lips, which is preferably adaptable by the provision of a replaceable gripping sleeve within a recess formed in the mounting (whereby differently sized gripping sleeves may be exchanged to received different sized rods or bars) and/or is preferably adjustable, e.g. by providing that an adjustable gripping sleeve may be fixedly mounted within a tapered recess in the mounting at a continuous or discrete range of positions thereby enabling adjustability of the effective channel diameter of the mounting means an restricting the degree of displaceability of the deflectable lips.

According to this embodiment, the fixing means, linkage and shaped receiving member may be defined as a housing that can be fixed to an article such as a luggage article (e.g. by two perpendicular fixing arms) and the adjustable gripping sleeve may be received into a recess defined in the housing and adjusted as discussed above.

The wheelchair towable article of the present invention comprises, disposed on the body portion, a multi-directional roller arrangement for contact with the ground. The multi-directional roller arrangement is intended to allow the towable article to move in any direction, forwards, backwards, sidewards or diagonally or following a curved path, with relatively low resistance. The provision of multi-directional rollers in combination with the mounting means configured such that the body portion is not pivotable about a vertical axis relative to a wheelchair to which it is mounted, enables a very maneuvrable and stable wheelchair towable article. The reverse and turn motions are comfortably handled without jackknife whilst the towable article simply moves in any direction it is caused to in order to retain its relationship with the wheelchair, without unnecessarily destabilising or jamming.

Any suitable multi-directional arrangement may be used and disposed at any convenient location, typically at a distal portion or distal end, of the body portion.

Preferably, the multi-directional roller arrangement comprises an arrangement of one or more castor wheels or omnidirectional wheels. For example, an arrangement of castor wheels (e.g. 3 to 5 or more wheels disposed on a horizontally disposed mounting which itself may optionally be rotatable about a vertical axis, and optionally a horizontal axis, relative to the body portion when disposed as mounted on a wheelchair) may be provided to be located beneath the distal portion of the body portion.

Preferably, the multi-directional roller arrangement comprises multi- or omnidirectional wheels or Mecanum wheels and more preferably two such wheels of which each one is laterally disposed relative to the body portion and preferably having a common axis (which is preferably, in use, parallel with the axis of the wheelchair wheels), typically at a distal portion thereof, for contact with the ground or floor in use. The omnidirectional wheels preferably each comprise at least one primary wheel member disposed, in use, in an upright orientation defining a plane generally parallel with a general plane of symmetry of the wheelchair or parallel with a corresponding plane of a wheelchair wheel (or within 10 degrees of each) or therebetween. Optionally there are two adjacent primary wheel members and optionally three or more (preferably up to three and most preferably just one) wheel members disposed adjacent to one another on each omnidirectional wheel. Each primary wheel member has disposed about its circumference a plurality of bearings, each of which is configured to rotate about a respective axis tangential to the circumference (or offset therefrom by an amount, but preferably about the tangential axis). The bearings are by necessity considerably smaller than the primary wheel member, but in any case are preferably sized so that at least four, more preferably at least eight and still more preferably at least ten bearings are disposed on each primary wheel member. The omnidirectional wheel arrangement enables the article to be moved in any direction.

An advantage of using omnidirectional wheels (over, say, castor wheels) is that the angle at which the bag is disposed at on the back of a wheelchair does not need to be predetermined. This is particularly useful as the height of fixing bar may vary from wheelchair to wheelchair altering the angle of the bag. The omnidirectional wheel is not affected by this change of angle. For a castor wheel to facilitate varying heights of mounting bar, one could optionally provide an adjustable fork element so the fork can be made vertical regardless of the angle of the bag. Thus, in an alternative embodiment, the multi-directional roller arrangement comprises an arrangement of castor wheels that are adjustable about a horizontal axis so that dependent upon the angle of the article or bag when mounted on the wheelchair, the castor wheels may be adjusted to rest effectively on the ground. In one example, the arrangement of castor wheels may comprise a castor wheel disposed at each side of the bag or article and each adjustable about a horizontal axis by being pivotally mounted on a castor support or being mounted on a support which is pivotally mounted relative to the bag, to facilitate adjustment about a horizontal axis. Preferably, the castor wheel disposed at each side is mounted on the same castor support (e.g. axle) which is pivotally or rotatably mounted relative to the bag or article so that it can be adjusted about a horizontal axis so that the castor wheels may be disposed effectively in contact with the ground to be able to roll effectively regardless of the angle of the bag/article when mounted on a wheelchair. Optionally, the angle of the castor wheels is adjusted by rotating about the horizontal axis (e.g. by rotating a common axel) and secured in the desired orientation by applying a securing means or tightening a securing fixing, which may be loosened for adjustment and tightened to secure each or an arrangement of castor wheels at a desired orientation. In a second example, the arrangement of castors may comprise a castor wheel disposed at each side of a bag or article (or two or more castor wheels disposed on an underside of the bag or article) for contact with the ground, wherein the castor comprises a mounting post for mounting in a corresponding socket (as commonly used as an attachment with castor wheels) and there is provided fixed onto the article or bag a mounting arrangement with mounting sockets disposed at a range of orientations (e.g. different angles about a horizontal axis), such that a castor wheel may be mounted in the socket at the orientation appropriate (e.g. with the post as close to vertical as is available) for the use of the bag or article with the wheelchair (and its mounting bar) and thus the angle at which the bag or article is disposed when mounted to that wheelchair.

Preferably, especially where a pair of omnidirectional wheels are provided which define an omnidirectional wheel axis, the distance between the omnidirectional wheel axis and the wheelchair wheel axis is separated by a horizontal distance of no more than 3 metres, preferably no more than 2 metres, typically at least 30 cm, and preferably in the range 0.75 metres to 1.5 metres.

Preferably, when mounted to a wheelchair, the angle of the line from mounting means to multi-directional roller arrangement (e.g. pair of omnidirectional wheels) relative to the vertical (e.g. a mounting bar to the ground) is preferably at least 30°, more preferably at least 40.

The towable article may be any article that needs to be towed by a wheelchair. Most typically, the body portion of the towable article is configured to contain goods, so it could be a trailer or a luggage article. Optionally, the towable article is a trailer. According to this embodiment, the article may be mounted to the wheelchair axle whereby a shallow angled flat bed may optionally be provided for a load to be transported on. Alternatively and in a preferred embodiment, the towable article is a luggage article and most preferably a roller bag or roller suitcase type luggage article, such articles being typically characterized by having wheels or castors at one end thereof and an extendable handle at the other end thereof.

The towable luggage article is preferably elongate and typically oblong in shape having the mounting means disposed at a portion proximal of the body portion to the wheelchair (preferably the proximal end), but optionally a medial portion of the body portion, and the multi-directional roller arrangement disposed at a distal portion of the body portion to the wheelchair (preferably the distal end). The body portion preferably is configured to be structurally self-supporting or have structural integrity and/or comprises a structural member, which may be a base or frame or internal component (e.g. rigid insert, preferably secured within the body portion) to provide a degree of structural integrity to the body portion such that, for example, its shape may be self-supporting when the article is attached to a wheelchair for towing. Structural integrity may be provided, for example, in one embodiment where the article comprises a roller bag or roller suitcase type luggage article, by the extendable handle arrangement and receptacle therefore. Some structural integrity is beneficial so that when a wheelchair user moves, the article and in particular the body portion moves accordingly (and that a lack of structural integrity does not lead to any significant degree of rotation of the body portion or substantial parts thereof about a vertical axis).

Preferably the towable article is a luggage article for containing clothing and everyday articles for transporting or is a musical instrument case or similar. Preferably the luggage article is of a size that can be capably handled by a wheelchair user in a towing arrangement, such as up to 3 metres in length (from mounting means to distal end or more particularly to the ground contacting multi-directional roller arrangement), preferably at least 0.6 metres in length, more preferably at least 0.75 metres in length, more preferably at least 0.8 metres, still more preferably at least 0.9 metres and optionally at least 1 metre in length, more preferably up to 2 metres in length, and preferably ally from 0.75 metres to 1.75 metres. Ideally, for a luggage article, the body portion is up to 1.25 metres in length A kit according to one aspect of the invention is for adapting an article body, such as a case or bag (e.g. as defined above as preferred examples of a body portion), to become a wheelchair-towable article as defined above. The kit comprises a mounting means adapted for removably mounting an article to which it is affixed to a rod or bar and having a fixing means for securing the mounting means to the article body and preferably a multi-directional roller arrangement adapted for fitting to the article body so as to be in contact with the ground in use. In one preferred embodiment, the kit is for adapting a roller bag or case, having an extendable handle arrangement at one end and a wheel arrangement at the other. According to this embodiment, the mounting means may be adapted to fix to the extendable handle or casing or mounting therefore (either permanently, e.g. by fastening with screws or the like, or temporarily, e.g. by applying a Velcro™ or other temporary fastening to the handle of the extendable handle. According to this embodiment, the multidirectional roller arrangement is a pair of omnidirectional wheels which are each configured to fit over and extend from the wheels of the roller bag or case or may alternatively be configured to replace the wheels of the roller bag or case in their mountings, especially when the wheels are laterally mounted. In another preferred embodiment, the kit is for adapting a musical instrument case. In this embodiment, the mounting means may preferably be adapted to fit (permanently or temporarily) to one end (e.g. the head) of a case, for example by way of a removable clamping or strapping mechanism and the multi-directional roller arrangement the same, which is preferably a pair of omnidirectional wheels disposed on a support frame adaptable to receive a distal end or body end of a musical instrument case.

In one preferred embodiment of the invention, there is a wheelchair-towable article (e.g. luggage article) comprising a body portion for containing or retaining articles to transport having at one end thereof a mounting member for mounting the article (e.g. luggage article) to a horizontal bar or tube formed or mounted on a wheelchair, the mounting member configured to be pivotable about the longitudinal axis of the horizontal bar or tube but fixedly mounted about all other axes, and at the other end thereof distal to the mounting member at least one castor wheel or multidirectional wheel arrangement for contact with the floor or ground across which the article (e.g. luggage article) is to be towed, whereby the article (e.g. luggage article) is in a fixed relationship with the wheelchair other than by virtue of pivoting about the longitudinal axis of the horizontal bar or tube and may move controllably with the wheelchair in all directions forwards and backwards.

The invention will now be described in more detail, without limitation, with reference to the accompanying Figures.

Figure 1:
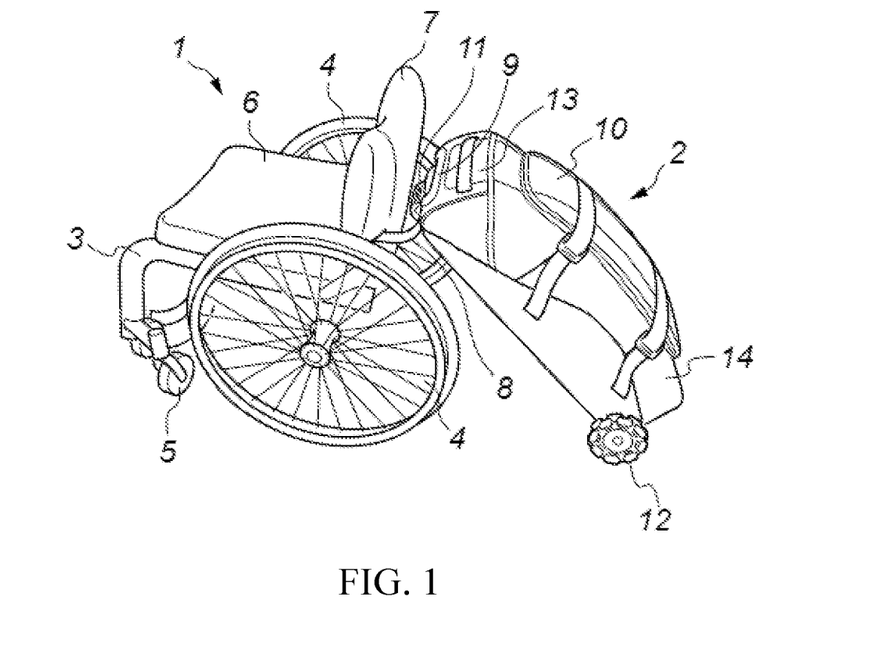
FIG. 1 is a perspective view of a wheelchair-towable article of an embodiment of one aspect of the invention attached to a wheelchair.
Figure 2:
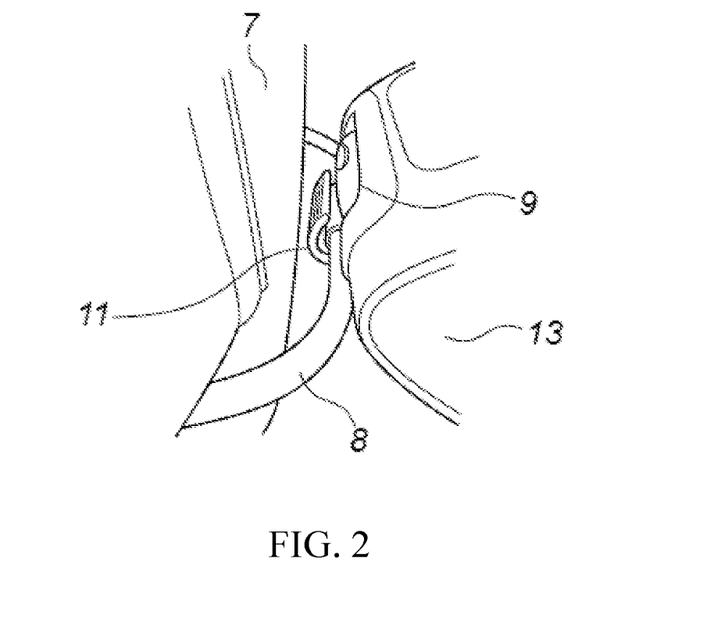
FIG. 2 is a close up perspective view of a portion of the wheelchair-towable article of FIG. 1 showing a mounting means of an embodiment of another aspect of the invention by which the article of FIG. 1 is attached to the wheelchair.
Figures 3, 4:
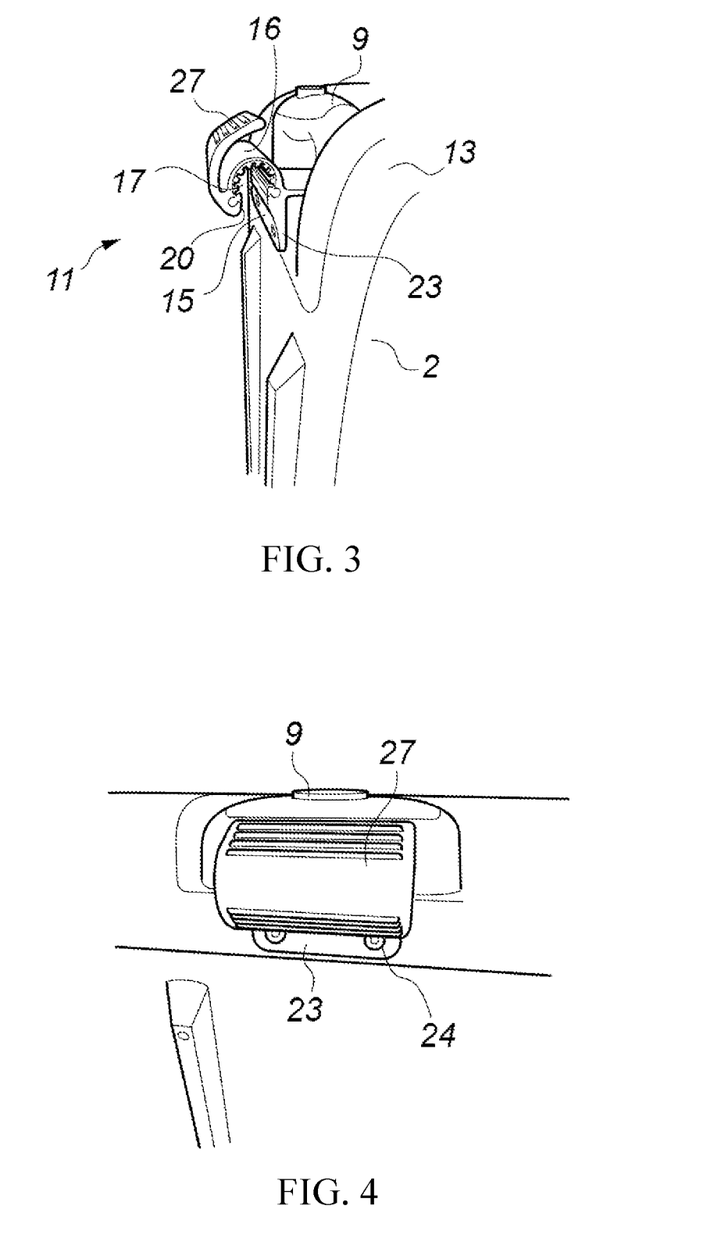
FIG. 3 is a side perspective view of the portion of the wheelchair-towable article showing a mounting means as in FIG. 2, but without being attached to a wheelchair.
FIG. 4 is front view of the mounting means of FIG. 3.

In FIG. 1, there is illustrated a wheelchair 1 having attached thereto a luggage article 2 according to an embodiment of the present invention. The wheelchair 1 comprises a frame 3 supported by wheels 4 and front castors 5 and supported by the frame a seat 6 and back 7. The frame 3 typically includes a horizontal bar 8 disposed to the rear of the back 7 of the wheelchair 1. The luggage article 2 is configured to removably attach to the horiztontal bar 8. The luggage article 2 is a generally elongate and oblong wheeled bag. It preferably has an integral structural member to provide the bag with some rigidity and structural form. This may include a base (not shown) or be provided at least in part by a separate extendable handle arrangement 9 (typically allowing use by other users using the bag in a conventional way). The luggage article 2 comprises a body portion 10 for containing goods (e.g. clothing for travel), a mounting member 11 at one end (at a first proximal portion) 13 proximal to the horizontal bar 8 and a pair of laterally disposed omnidirectional wheels 12 at the other end (at a second distal portion) 14, distal to the horizontal bar 8.

As shown, the elongate body portion 10 is disposed, when engaged with the horizontal bar 8 and when the wheels 12 are resting on the ground, at an angle to the vertical of approximately 45°. At too small an angle, the luggage article may not readily move backwards when the wheelchair moves backwards and may tend to jack-up the back wheels of the wheelchair.

Mounting member 11 (see FIGS. 2 to 5) is configured to be simply and readily removably attachable to the horizontal bar 8. Mounting member 11 is an elongate member having an elongate heel portion 15 and extending outward therefrom an elongate curved member 16 defining an elongate channel 17 for receiving the horizontal bar 8. As shown, the channel 17 extends for a length of about 9 cm. Channel 17 typically has a resting diameter of about or marginally less than the diameter of the horizontal bar 8 (e.g. in the range 19-25 mm) it is configured to receive. The horizontal bar 8 may be received into the channel 17 via narrower mouth 18 defined by supporting lip 19 and deflecting lip 20. The heal 15 and mounting member 11 as a whole is rigidly fixed to the body portion 10 and typically to the facings 21 surrounding a separate extendable handle arrangement 9 via first and second elongate flanges 22,23 each having fasteners 24 secured via apertures (not shown) to respective facings 21. The extending curved member 16 is resiliently flexible and the deflectable lip 20 resiliently deflectable so as to allow passage of the horizontal bar 8 through the extended mouth 18 when pressure is applied on the lips 19,20 by the bar 8 (causing the deflection of lip 20 and outward extension of curved member 16) and into the elongate channel 17 whereupon the curved member 16 flexes back toward its resting position until its snugly grips around the horizontal bar 8. When the channel 17 is in receipt of the horizontal bar 8 the channel and bar will have the same or adjacent longitudinal axes, the curved member 16 being able to move about the longitudinal axis relative to the horizontal whereupon the mounting member 11 and the close and fixedly coupled body portion also rotate or pivot about the longitudinal axis. The elongate arrangement of the channel 17 and snug fit of the horizontal bar in the channel inhibit any movement about any other axis and most notably inhibit rotation about a vertical axis.

Thus when the wheelchair 1 is operated with the attached luggage article 2 over steps or uneven surfaces the luggage article 2 may move up and down relative to the wheelchair wheels 4 as they pass over steps, kerbs or uneven surfaces by virtue of the freedom to rotate about the axis of the horizontal bar 8.

The omnidirectional wheels 12 (illustrated in FIG. 8) disposed laterally at the distal portion 14 of the body portion 10 for contact with the ground in use, each comprise a primary wheel 25 rotatable about a primary axis and having a plane substantially parallel with a plane of the wheels 4 of the wheelchair 1 so they can rotate in the same direction as the rotation of the wheelchair wheels 4 when they move and disposed about the circumference of the primary wheel 25 a plurality of bearings 26 configured to rotate about the circumference of the primary wheel 25 and caused to do so when moved in a direction lateral to the plane of the primary wheel 25. Optionally, each omnidirectional wheel 12 has two primary wheels 25 each having a plurality of bearings 26 disposed for rotation about the circumference of the corresponding primary wheel 25.

Figure 8:
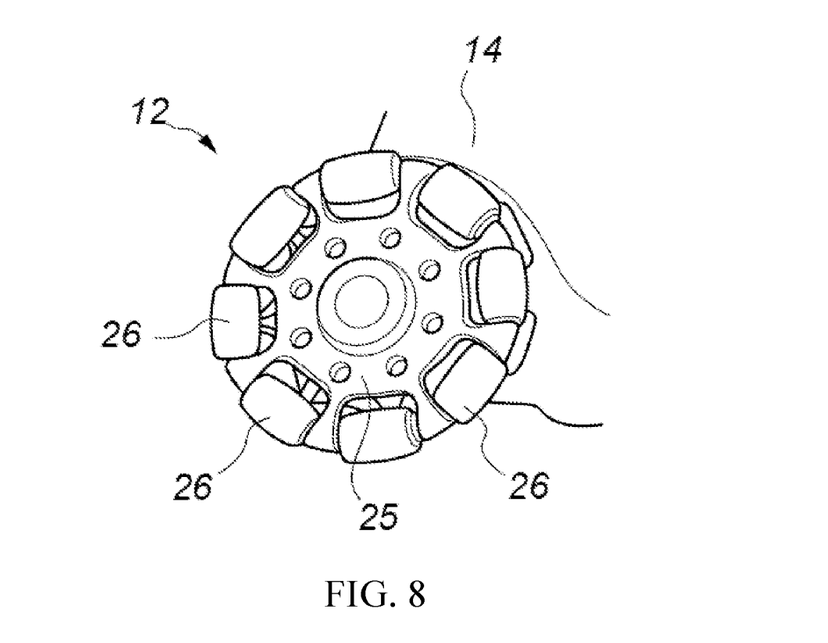
FIG. 8 is a side view of an omnidirectional wheel used in the article illustrated in FIG. 1.

Thus when the wheelchair 1 is maneuvred forwards in a tight curve, it is not hindered by an attached luggage article 2, the circumference-mounted bearings 26 providing smooth passage of the luggage article 2 along any non-linear movement. When the wheelchair 1 is reversed and more particular reversed in a curved path, the lack of ability of the body portion to rotate about a vertical axis inhibit any jack-knife response, whilst the omnidirectional wheels 12 facilitate free uninhibited movement of the luggage article 2 with the wheelchair.

The luggage article 2 as described enables free and uninhibited movement of a towed luggage article 2 attached to a wheelchair 1 without restricting accessor maneuvrability of the wheelchair 1 and its user.

The article 2 may be disengaged from the wheelchair 1 by the user holding a curved lever handle 27 which extends about the exterior of the curved member 10 in the opposing direction from a distal end thereof (distal that is to the heel portion 15). By depressing the lever handle 27 (toward the curved member, by pressing the peripheral portion thereof with the heel of the hand), the curved member 10 is caused to flex and in particular the deflecting lip 20 is caused to deflect whereupon the user may lift the handle 27 (e.g. with the forefingers, from the base of the lever handle) to lift the mounting member 11 allowing the horizontal bar to pass back out through channel 17 and separating from the article 2. More particularly, to disengage a luggage article 2, the user should cups their hand around the lever handle 27 pushing down with their palm on top of the lever and then lifting upwards using forefingers whilst keeping their hand cupped around the lever handle 27. If their wheelchair 1 does not have enough room to put their hand around the lever handle 27, the user may hold a handle 9 or other suitable point of grip on the luggage article 2 and pull upwards to free the curved clamp member 10 from the bar 8.

Figure 5:
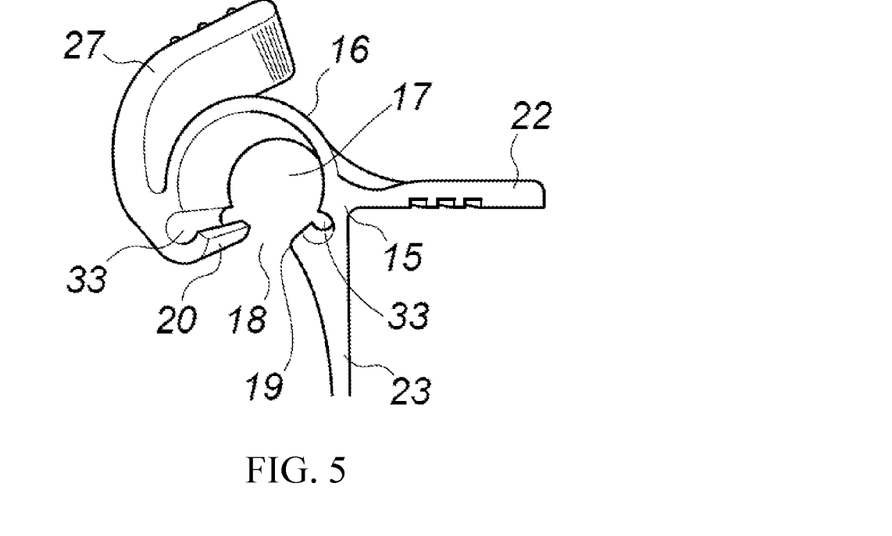
FIG. 5 is a side view of a mounting means for removably mounting an article to a rod or bar according to one embodiment of an aspect of the invention, which mounting means is absent an inner sleeve.
Figure 6:
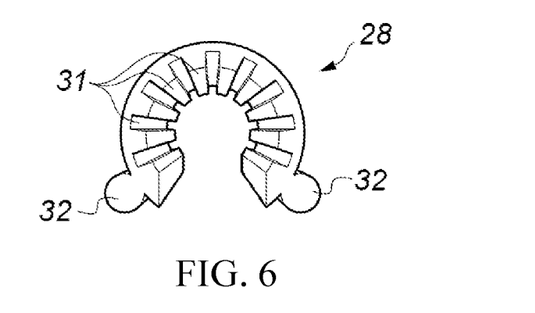
FIG. 6 is a side view of an inner sleeve for fitting to a mounting means according to the embodiment of FIG. 5.
Figure 7:
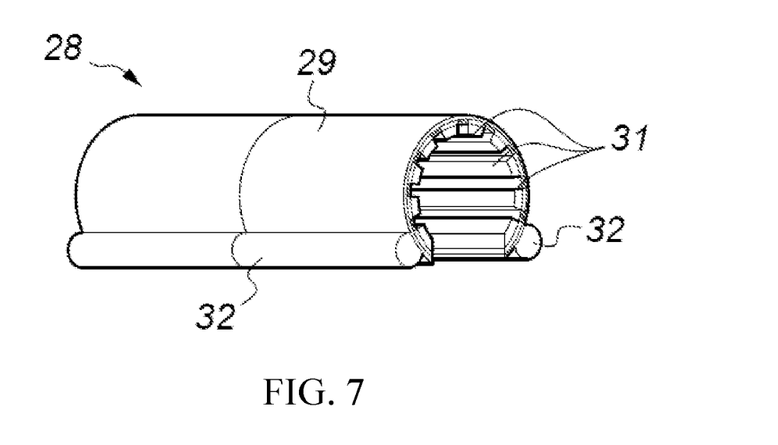
FIG. 7 is a perspective view of an inner sleeve of FIG. 6.

An embodiment of the mounting member 11 is shown in FIGS. 5 to 7. A mounting member 11 has a corrugated or castellated elongate inner sleeve 28 disposed or for disposal in and to line the elongate channel 17. An outer surface 29 of the sleeve 28 is preferably smooth for contact with the curved member inner surface 30. The depth or height of the corrugations or castellations 31 may be selected according to the diameter of channel required to receive and to snugly grip the horizontal bar 8 to which the mounting member 11 is to be engaged. The sleeve 28 may thus be interchangeable. The sleeve 28 which has a generally horseshoe shape or u-shape has at each periphery thereof an elongate retaining element 32 running along the length of the sleeve 28 which may be received in corresponding retaining slots 33 for engaging the sleeve 28 in the channel 17. A sleeve 28 with corrugations 31 of a greater extent and thus producing in situ a smaller diameter adapted channel 17 is shown in FIG. 6 whilst a sleeve 28 with corrugations 31 of a lesser extent and thus a greater diameter adapted channel 17 is shown in FIG. 7. The inner sleeve 28 at the same time provides some additional support and robustness for the curved member 16 and mounting member 11 whilst the corrugations or castellations 31 enable additional flexibility in the inner sleeve 28 and the combined mounting member. By providing corrugations or castellations 31 to vary the effective internal diameter of the channel 17, the ability to accommodate varying diameters of bar 8 may be achieved without significantly changing the stiffness or flexibility of the mounting member 11 which is characterised by the thickness of the mounting member to the level of the grooves in the inner sleeve 28, which is the same regardless of the extend of corrugations or castellations 31.

Figure 9:
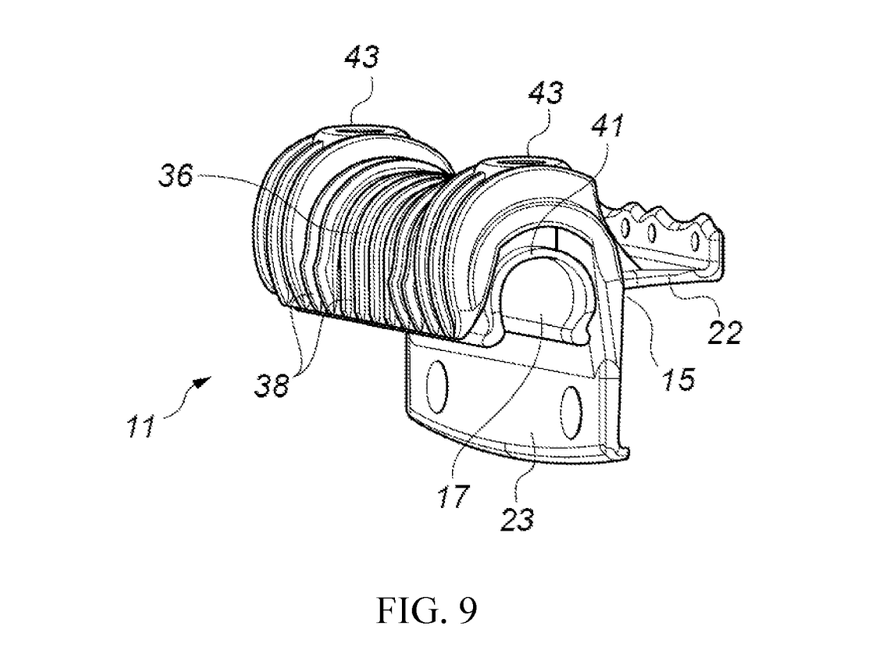
FIG. 9 is perspective view of a mounting means for removably mounting an article to a rod or bar according to another embodiment of an aspect of the invention.
Figure 10:
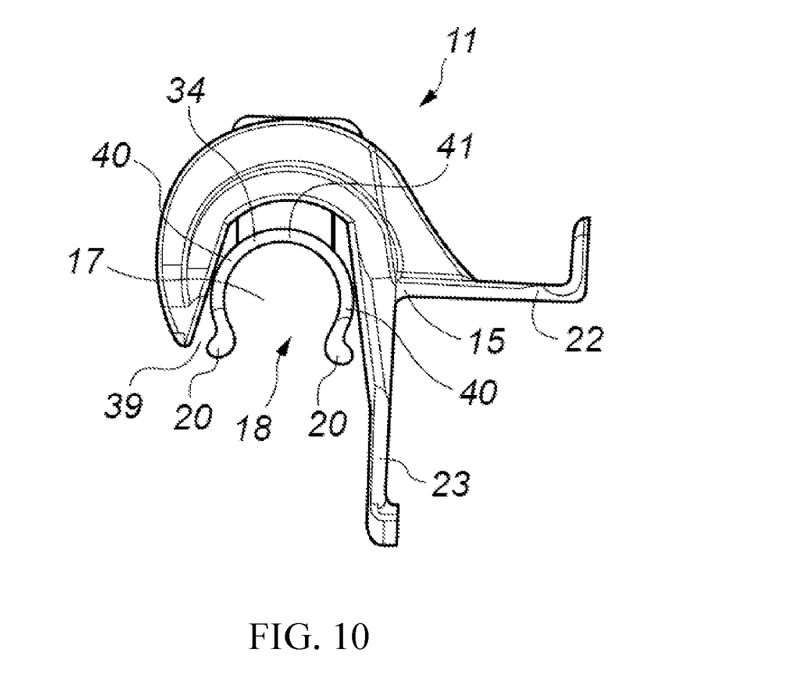
FIG. 10 is a side view of the mounting means of FIG. 9.

An alternative embodiment of a mounting member (or mounting means) 11 for use with a luggage article 2 is shown in FIGS. 9 and 10. In the alternative embodiment, mounting member 11 comprises an adjustable gripping sleeve 34 received within a tapered elongate recess 35 defined by a shaped receiving member 36 of the mounting member 11. The mounting member 11 is fixable to facings (not shown) of a luggage article 2 via first and second elongate flanges 22,23 extending orthogonally relative to one another from a heal 15 and via fixings (not shown) fitted into fixing apertures 37 provided in elongate flanges 22,23. Thus the heal 15 and mounting member 11 is rigidly fixed to the body portion 10 of the luggage article 2. The shaped receiving member 36 extends from the heal 15 and is rigidly and fixedly linked to the fixing means in the form of elongate flanges 22,23. The shaped receiving member 36 is provided with lateral ribs 38 which enhance its rigidity. Thus tapered elongate recess 35 is a fixed and rigidly shaped recess that tapers inwardly (and upwardly) from a broad (lower) opening 39.

The adjustable elongate gripping sleeve 34 (illustrated also in FIG. 11) defines a channel 17 for receiving and retaining (by gripping) a horizontal bar 8. The channel is defined by two opposed, resiliently deflectable curved leaves 40 extending from a spine 41 (that is positioned uppermost and is placed first into the recess 35). The curved leaves 40 have at their ends distal from the spine 41 comprise resiliently deflectable lips 20 that define a mouth 18 to the channel 17. Thus, a bar 8 may be aligned with the mouth 18 of the adjustable elongate gripping sleeve 34 and received in the channel 17 by pressing the bar and mounting member 11 together causing lips 20 and to an extend leaves 40 to deflect until the bar is within the channel 17 whereupon the lips 20 and leaves 40 return toward their starting position unless prevented so by the bar 8 thus gripping or retaining the bar 8 within the channel. The bar 8 may be removed by pulling the mounting member 11 away from the bar 8 again causing outward deflection of the lips 20 and to an extent the leaves 40 until the bar 8 passes the lips 20 whereupon it is released and the lips 20 and leaves 40 return to their starting position.

Figure 11:
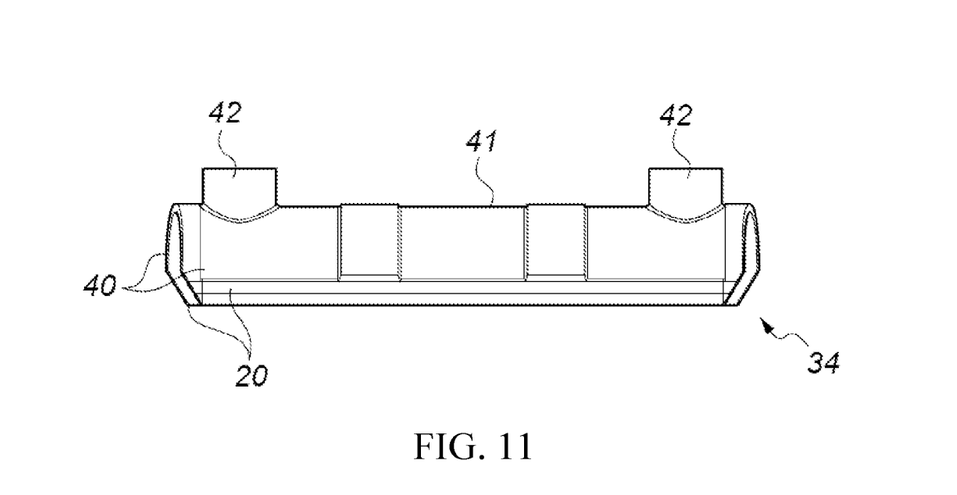
FIG. 11 is a front view of an adjustable gripping sleeve used in the mounting means of FIG. 9.

The adjustable gripping sleeve 34 may be provided in one or more of a range of available diameters so that a suitable diameter of sleeve 34 may be selected according to the size of bar 8 the mounting member 11 is to be mounted to. The adjustable gripping sleeve 34 is received into the elongate recess 34 of the shaped receiving member 36 until the curved leaves 40 abut the internal surfaces defining the recess 34. Lower opening 39 has a width greater than the resting diameter of adjustable gripping sleeve 34. The adjustable gripping sleeve 34 may be secured into position by fixings (not shown) such as bolts extending from a pair of fixing protrusion 42 extending upwards from the spine 41, which fixings attach to corresponding fixing apertures 43 in the upper surface of the shaped receiving member 36. By its position in and relationship with the tapered recess 35 and the shaped receiving member 36, the adjustable gripping sleeve 34 is restricted as to how much the leaves 40 and lips 20 may deflect and thus the size of horizontal bar 8 that may be received into the channel 17.

The fit of the gripping arrangement or mounting member 11 on a particular bar 8 may be fine tuned by adjusting the position of the adjustable gripping sleeve 34 within the tapered recess 35. By tightening the fixings securing the adjustable gripping sleeve 34 in the tapered recess 35, the sleeve 34 is drawn further into the tapered recess 35 thereby deflecting the resiliently deflectable leaves 40 inwards and restraining them in the deflected inwards position thereby effectively reducing the diameter of the channel 17 and the size of the mouth 18 and flexibility of the lips 20. Thus, providing a more snug fit or enabling a narrower diameter bar or rod 8 to be received. Likewise the fit can be relaxed back toward the snug fit (where the sleeve 34 in its resting state is snugly fitted within the recess 35).

The invention has been described with reference to a preferred embodiment. However, it will be appreciated that variations and modifications can be effected by a person of ordinary skill in the art without departing from the scope of the invention.

What is claimed is:

1. A wheelchair-towable luggage article, comprising:
a body portion configured for attaching to a wheelchair via a mounting means to dispose the article to the rear of a seat of the wheelchair and disposed on the body portion a multi-directional roller arrangement comprising omni-directional wheels for contact with the ground, wherein the body portion is configured to be pivotable only about a transverse axis with respect to the wheelchair, and wherein the mounting means comprises an elongate gripping member defining a bar-receiving channel from 5 to 30 cm in length for engagement with a horizontal bar mounted on a wheelchair, wherein the elongate gripping member is configured to be pivotable about a longitudinal axis of the horizontal bar mounted on the wheelchair and wherein the elongate gripping member comprises a pair of resiliently deflectable opposing lips that define the bar-receiving channel.

2. The article according of claim 1, wherein the mounting member is configured to be pivotable about the longitudinal axis of the horizontal bar or tube but fixedly mounted about all other axes.

3. The article according to claim 1, wherein the body portion is elongate and the mounting means is disposed on or in relation to a first end portion and the multi-directional roller arrangement is disposed on or in relation to a second end portion distal to the first end portion.

4. The article according to claim 1, wherein the multi-directional roller arrangement comprises two omnidirectional wheels of which each one is laterally disposed relative to the body portion, for contact with the ground or floor in use.

* * * * *